US012602180B2

(12) United States Patent
Kwon et al.

(10) Patent No.: US 12,602,180 B2
(45) Date of Patent: Apr. 14, 2026

(54) STORAGE DEVICE FOR REDUCING MULTI STREAM WRITE IMBALANCE AND OPERATION METHOD THEREOF

(71) Applicant: SAMSUNG ELECTRONICS CO., LTD., Suwon-si (KR)

(72) Inventors: Taehyung Kwon, Suwon-si (KR); Seunghwan Ha, Suwon-si (KR); Shine Kim, Suwon-si (KR); Jeong-Eun Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/664,723

(22) Filed: May 15, 2024

(65) Prior Publication Data

US 2025/0173075 A1     May 29, 2025

(30) Foreign Application Priority Data

Nov. 28, 2023     (KR) ........................ 10-2023-0167598

(51) Int. Cl.
G06F 3/06 (2006.01)
(52) U.S. Cl.
CPC .......... G06F 3/0631 (2013.01); G06F 3/0604 (2013.01); G06F 3/0679 (2013.01)
(58) Field of Classification Search
CPC ..... G06F 3/0604; G06F 3/0631; G06F 3/0679
See application file for complete search history.

(56) References Cited

U.S. PATENT DOCUMENTS

| | | | |
|---|---|---|---|
| 9,218,283 | B2 | 12/2015 | Gorobets et al. |
| 10,922,014 | B1 | 2/2021 | Henze |
| 11,726,717 | B2 | 8/2023 | Ellis et al. |
| 2015/0363342 | A1* | 12/2015 | Tuers ................... G06F 13/4243 |
| | | | 710/308 |
| 2019/0294553 | A1* | 9/2019 | Gavens ................. G06F 3/0679 |
| 2021/0223998 | A1 | 7/2021 | Li et al. |
| 2021/0255796 | A1 | 8/2021 | Takano |
| 2023/0130884 | A1 | 4/2023 | Choo et al. |
| 2023/0186995 | A1* | 6/2023 | Huang ................. G11C 11/5628 |
| | | | 365/185.24 |
| 2023/0221888 | A1 | 7/2023 | Sharma et al. |

FOREIGN PATENT DOCUMENTS

KR     10-2023-0059229 A     5/2023

* cited by examiner

*Primary Examiner* — Jane W Benner
(74) *Attorney, Agent, or Firm* — Sughrue Mion, PLLC

(57)     ABSTRACT

Disclosed is a method of operating a storage device including a plurality of chips, the method including: receiving a write request of stream data; checking a program status or a stream queue of each of the plurality of chips; based on a determination that there is at least one chip in a ready state with an empty stream queue among the plurality of chips, allocating the stream data to the at least one chip in the ready state; and based on a determination that there is no chip in the ready state with the empty stream queue among the plurality of chips, allocating the stream data to at least one chip based on a number of streams in a stream queue among the plurality of chips.

20 Claims, 14 Drawing Sheets

1216

| State Chip | Ready/Busy | Number of S_Queue | WL Offset | | |
|---|---|---|---|---|---|
| | | | Stream_0 | Stream_1 | Stream_2 |
| Chip_0 | Busy | 1 | WL10 | WL30 | WL20 |
| Chip_1 | Busy | 1 | WL10 | WL30 | WL21 |
| Chip_2 | Busy | 1 | WL10 | WL30 | WL21 |
| Chip_3 | Ready | 0 | WL9 | WL30 | WL21 |
| Chip_4 | Ready | 0 | WL9 | WL31 | WL21 |
| Chip_5 | Ready | 0 | WL9 | WL31 | WL20 |
| Chip_6 | Ready | 0 | WL9 | WL31 | WL20 |
| Chip_7 | Ready | 0 | WL9 | WL30 | WL20 |

| | | | |
|---|---|---|---|
| Chip_0 | Chip_1 | Chip_2 | Chip_3 |

CH0

| | | | |
|---|---|---|---|
| Chip_4 | Chip_5 | Chip_6 | Chip_7 |

CH1

1210

Storage Controller

| State<br>Chip | Ready/Busy | Number of<br>S_Queue | WL Offset | | |
|---|---|---|---|---|---|
| | | | Stream_0 | Stream_1 | Stream_2 |
| Chip_0 | Busy | 1 | WL10 | WL30 | WL20 |
| Chip_1 | Busy | 1 | WL10 | WL30 | WL21 |
| Chip_2 | Busy | 1 | WL10 | WL30 | WL21 |
| Chip_3 | Ready | 0 | WL9 | WL30 | WL21 |
| Chip_4 | Ready | 0 | WL9 | WL31 | WL21 |
| Chip_5 | Ready | 0 | WL9 | WL31 | WL20 |
| Chip_6 | Ready | 0 | WL9 | WL31 | WL20 |
| Chip_7 | Ready | 0 | WL9 | WL30 | WL20 |

FIG. 9

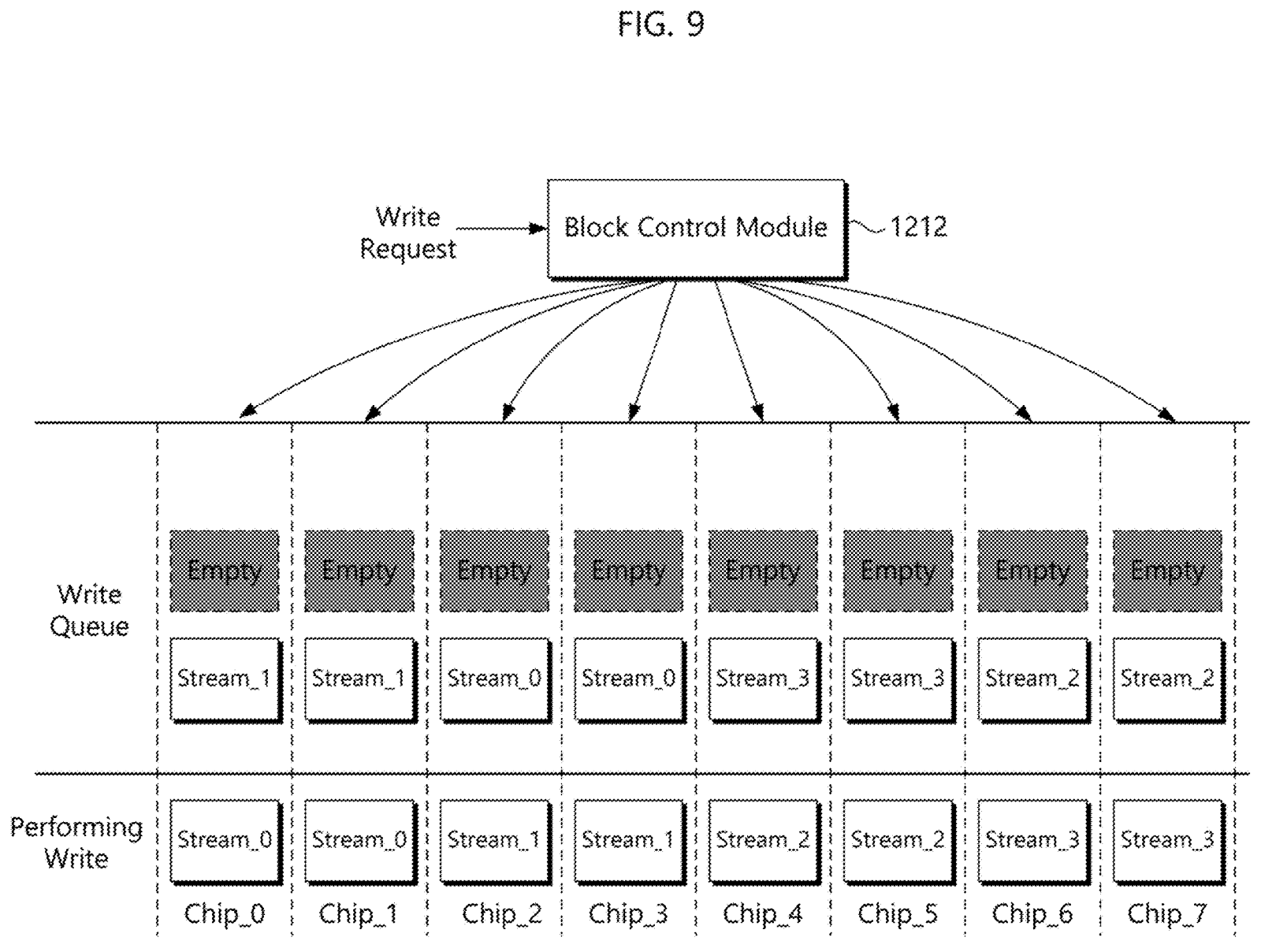

Block Control Module ~1212

Write Request

| Write Queue | Empty | Stream_1 | Empty | Stream_1 | Empty | Stream_0 | Empty | Stream_0 | Empty | Stream_3 | Empty | Stream_3 | Empty | Stream_2 | Empty | Stream_2 |
| Performing Write | Stream_0 | Chip_0 | Stream_0 | Chip_1 | Stream_1 | Chip_2 | Stream_1 | Chip_3 | Stream_2 | Chip_4 | Stream_2 | Chip_5 | Stream_3 | Chip_6 | Stream_3 | Chip_7 |

Start

Receive Write stream — S310

Generate random seuqence of chips — S320

Assign the program of the stream to the selected chip. — S330

End

Figure 14:
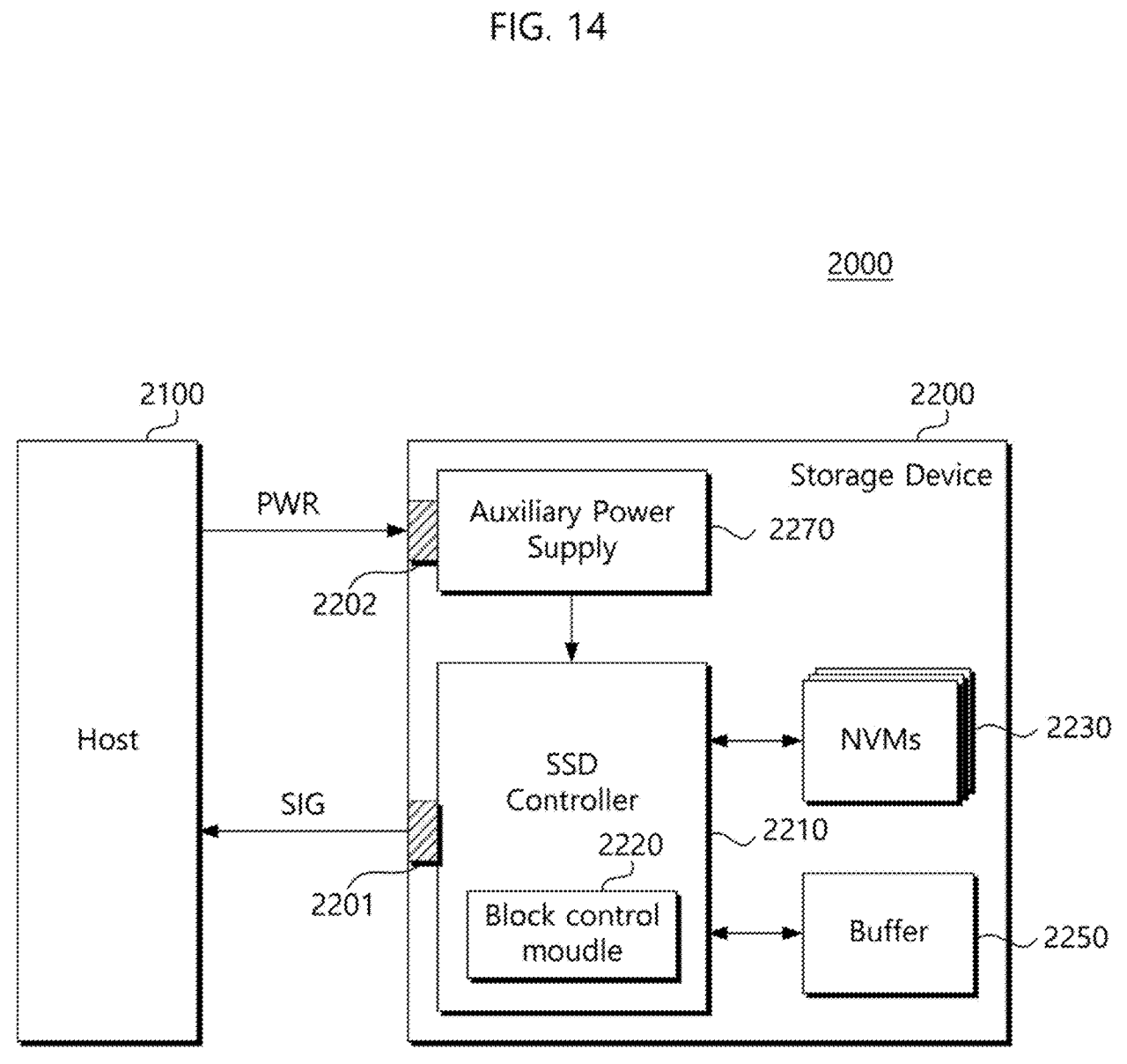

Storage Device

2270

Auxiliary Power Supply

2202

PWR

2230

NVMs

2250

Buffer

2210

SSD Controller

2220

Block control moudle

2201

SIG

2100

Host

STORAGE DEVICE FOR REDUCING MULTI STREAM WRITE IMBALANCE AND OPERATION METHOD THEREOF

CROSS-REFERENCE TO RELATED APPLICATION

This application is based on and claims priority under 35 U.S.C. § 119 to Korean Patent Application No. 10-2023-0167598 filed on Nov. 25, 2023, in the Korean Intellectual Property Office, the disclosure of which is incorporated by reference herein in its entirety.

BACKGROUND

Embodiments of the present disclosure described herein relate to a storage device, and more specifically, to a storage device and a method of operating the same that can prevent write imbalance in which write data is concentrated in a specific memory chip or memory area when programming multi-stream data.

As storage capacity increases, technology for writing data in a multi-stream manner is being applied to a storage device such as a solid state drive (SSD). The efficiency of writing, erasing, or managing a storage device can be increased by classifying and managing data with the same properties or attributes in a same stream.

However, when programming data in a multi-stream method, data may be concentrated and programmed on one or more specific memory chips among all memory chips such as flash memory chips. If these problems such as data concentration are not solved, a write load at the specific memory chips may be saturated in a storage device with a limited buffer memory size. In this case, program operations in the specific memory chips may not be completed for a long period of time, resulting in performance degradation. Therefore, a method for preventing stream write operations from being concentrated on specific memory chips in a multi-stream storage device is required. Herebelow, a memory chip may be simply referred to as a chip.

SUMMARY

Embodiments of the present disclosure provides a multi-stream storage device that performs a write balancing operation and a method of operating the same.

According to one or more embodiments, there is provided a method of operating a storage device including a plurality of chips. The method may include: receiving a write request of stream data; checking a program status or a stream queue of each of the plurality of chips; based on a determination that there is at least one chip in a ready state with an empty stream queue among the plurality of chips, allocating the stream data to the at least one chip in the ready state; and based on a determination that there is no chip in the ready state with the empty stream queue among the plurality of chips, allocating the stream data to at least one chip based on a number of streams in a stream queue among the plurality of chips.

According to one or more embodiments, there is provided a storage device storing multi-stream data which may include: a non-volatile memory device including a plurality of chips; and a storage controller configured to allocate a write-requested stream to at least one of the plurality of chips by referring to a program status and a stream queue state of each of the plurality of chips, wherein, based on a determination that at least one chip in a ready state with an empty stream queue exists among the plurality of chips, the storage controller is configured to allocate the write-requested stream to the at least one chip in the ready state, and wherein, based on a determination that there is no chip in the ready state with the empty stream queue among the plurality of chips, the storage controller is configured to allocate the write-requested stream to at least one chip based on a number of streams in a stream queue among the plurality of chips.

According to one or more embodiments, there is provided a method of operating a storage device including a plurality of NAND chips. The method may include: receiving a write request for stream data; checking a word line offset indicating a programmed word line of each of the plurality of NAND chips; selecting candidate chips to write the stream data according to the word line offset; and programming the stream data into the candidate chips, wherein in the selecting the candidate chips, at least one chip having an unprogrammed first word line and at least one chip having an unprogrammed second word line to be programmed after the first word line are selected as the candidate chips among the plurality of NAND chips.

BRIEF DESCRIPTION OF DRAWINGS

The above and other objects and features of the disclosure will become apparent by describing in detail embodiments thereof with reference to the accompanying drawings.

FIG. 3 is a block diagram illustrating the configuration of the non-volatile memory device shown in FIG. 2.

FIG. 5 is a diagram showing an example of the stream queue state table shown in FIG. 2, according to one or more embodiments.

FIG. 9 is a diagram showing a stream allocation method of the block control module shown in FIG. 2, according to still one or more other embodiments.

FIG. 13 is a block diagram showing a storage controller, according to one or more embodiments.

FIG. 14 is a block diagram showing a storage system, according to one or more embodiments.

DETAILED DESCRIPTION

The embodiments described herein are non-limiting example embodiments, and thus, the disclosure is not limited thereto and may be realized in various other forms. Each of the embodiments provided in the description herein is not excluded from being associated with one or more features of another example or another embodiment also provided herein or not provided herein but consistent with the disclosure. For example, even if matters described in a specific example or embodiment are not described in a different example or embodiment, the matters may be understood as being related to or combinable with the different example or embodiment, unless otherwise mentioned in descriptions thereof. Wherever possible, the same reference numbers may be used in the description and drawings to refer to the same or like parts. As used herein, an expression "at least one of" preceding a list of elements modifies the entire list of the elements and does not modify the individual elements of the list. For example, an expression, "at least one of a, b, and c" should be understood as including only a, only b, only c, both a and b, both a and c, both b and c, or all of a, b, and c. Herein, when a term "same" or "equal" is used to compare a dimension of two or more elements, the term may cover a "substantially same" or "substantially equal" dimension.

Figure 1:
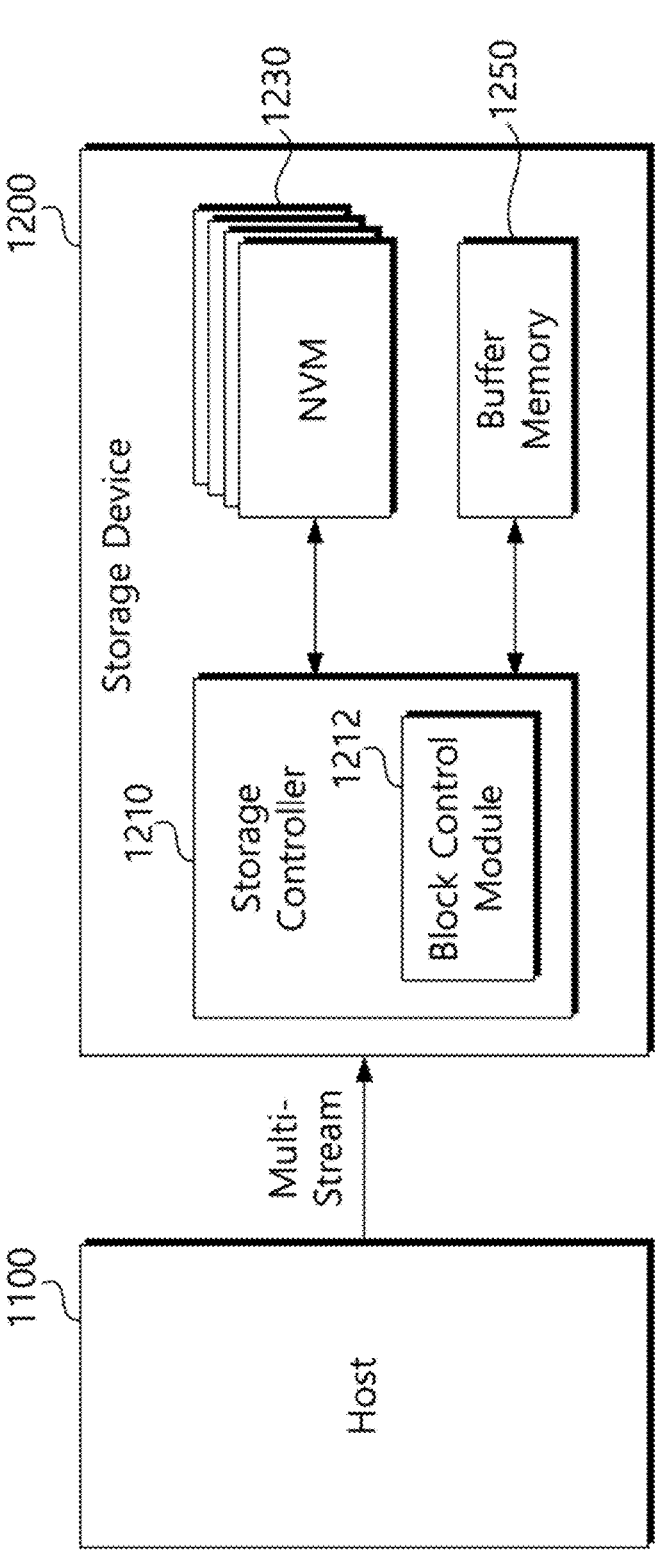
FIG. 1 is a block diagram showing a storage system including a storage device, according to one or more embodiments.

FIG. 1 is a block diagram showing a storage system including a storage device, according to one or more embodiments. Referring to FIG. 1, a storage system 1000 may include a host 1100 and a storage device 1200. The storage device 1200 may include a storage controller 1210, a non-volatile memory device 1230, and a buffer memory 1250.

The host 1100 can manage and process overall operations of the storage system 1000. The host 1100 may transmit a read request or a write request to the storage device 1200. For example, the host 1100 may transmit write data in units of streams. For this function, the host 1100 may generate write data including a write command and a stream identifier (ID) for a write request. The host 1100 may perform various arithmetic/logical operations to access the storage device 1200. For example, host 1100 may include one or more processor cores. The host 1100 may be implemented using one or more dedicated circuits such as a field programmable gate array (FPGA) or an application specific integrated circuit (ASIC), or may be implemented as one or more system on chips (SoCs). The host 1100 may include at least one of a general-purpose processor, a dedicated processor, and an application processor. The host 1100 may be a processor itself or an electronic device or system including the processor.

The storage device 1200 may include a storage controller 1210, a non-volatile memory device 1230, and a buffer memory 1250. The storage controller 1210 may program data in the non-volatile memory device 1230 according to a write request from the host 1100. The storage controller 1210 may also read data stored in the non-volatile memory device 1230 in response to a read request from the host 1100. For this function, the storage controller 1210 may use a mapping table that defines a correspondence between a logical address and a physical address of data stored (or to be stored) in the non-volatile memory device 1230. The mapping table may be stored and managed in the buffer memory 1250, which may be a dynamic random-access memory (DRAM).

The storage controller 1210 may perform a function of a flash translation layer (FTL). By using the flash translation layer, the shortcomings of the non-volatile memory device 1230, such as erase-before-write and mismatch between erase units and write units, can be compensated for. For example, the flash translation layer maps a logical address generated by a file system of the host 1100 to a physical address of the non-volatile memory device 1230. In addition, the flash translation layer may perform wear leveling to manage a lifespan of the non-volatile memory device 1230 and garbage collection to manage data capacity. The non-volatile memory device 1230 may include a plurality of chips each of which includes a plurality of memory cells in a form of memory array, etc., not being limited thereto.

The storage controller 1210 may include a block control module 1212 that performs write balancing between the chips of the non-volatile memory device 1230 for multi-stream data. As the capacity or performance of the non-volatile memory device 1230 improves, a larger buffer memory 1250 is required for buffering write data or storing a mapping table. However, as the size of the buffer memory 1250 increases, relatively large costs are incurred. Accordingly, in order to minimize an increase in cost due to an increase in the capacity of the buffer memory 1250, the block control module 1212 may allocate multi-stream data to the chips of the non-volatile memory device 1230 in a balanced manner.

The block control module 1212 may prevent stream imbalance in which multi-stream data is intensively allocated to at least one or some of the chips of the non-volatile memory device 1230. The block control module 1212 may evenly allocate one or more write-requested streams (which may be referred to as one or more write streams herebelow) to the chips of the non-volatile memory device 1230. For example, the block control module 1212 may evenly allocate one write stream among multi-streams to a plurality of writable chips such that the same amount of data is programmed to each of the plurality of writable chips.

For this function, the block control module 1212 may monitor a program status of each chip of the non-volatile memory device 1230. The program status of each chip may include, for example, a word line offset of a memory block in which a program is in progress or has been completed. A program operation of the non-volatile memory device 12130 may be performed according to an order of arrangement of word lines. Accordingly, if a program operation of a memory block selected in one chip is completed from a word line WL0 to a word line WL9, the block control module 1212 may have a word line offset corresponding to the word line WL9. The block control module 1212 may monitor the word line offset of each chip of the non-volatile memory device 1230 and allocate any one of the streams requested for subsequent writing.

In addition, the block control module 1212 may evenly allocate streams requested to be written to the chips by referring to the number of streams listed in a queue of each chip and a program progress status of each chip. In one or more other embodiments, the block control module 1212 may divide at least one stream requested to be written and randomly assign the divided streams to the chips, respectively. Generally, write data is allocated according to the order of arrangement of chips, but the block control module 1212 may generate a random sequence for the order of chips and allocate write streams according to the generated random sequence. These features will be further explained later.

The non-volatile memory device 1230 may store data received from the storage controller 1210 or transmit data stored therein to the storage controller 1210 under a control of the storage controller 1210. The non-volatile memory device 1230 may include a plurality of chips or dies implemented as NAND-type flash memory. Each of the chips may include a plurality of memory blocks. In the non-volatile memory device 1230, only one memory block is selected from one chip during a write operation. Therefore, selecting one chip during a write operation may refer to selecting one memory block. Here, each of the plurality of memory blocks may have a three-dimensional memory structure in which word line layers are stacked in a vertical direction on a substrate. Each of the memory blocks may be managed by the storage controller 1210 through information for wear leveling, such as an erase count (hereinafter referred to as EC).

The buffer memory 1250 may provide a buffer function or a metadata storage function of the storage device 1200. Additionally, the buffer memory 1250 may support a direct memory access (DMA) function of data exchanged between the non-volatile memory device 1230 and the host 1100. For example, the buffer memory 1250 provides a buffer function to temporarily store data to be programmed in the non-volatile memory device 1230 or data output from the non-volatile memory device 1230. As another example, the buffer memory 1250 may store a mapping table or various meta data generated by the storage controller 1210. In addition, the buffer memory 1250 may provide a buffer function for temporarily storing a write stream provided in a multi-stream manner.

According to the above-described configuration, the storage device 1200 can prevent stream imbalance in which write streams from the host 1100 are concentrated on one chip or some chips. Accordingly, performance degradation due to stream imbalance in the storage device 1200 that stores multi-stream data and reduction in utilization and a lifespan of the non-volatile memory device 1230 can be prevented.

Figure 2:
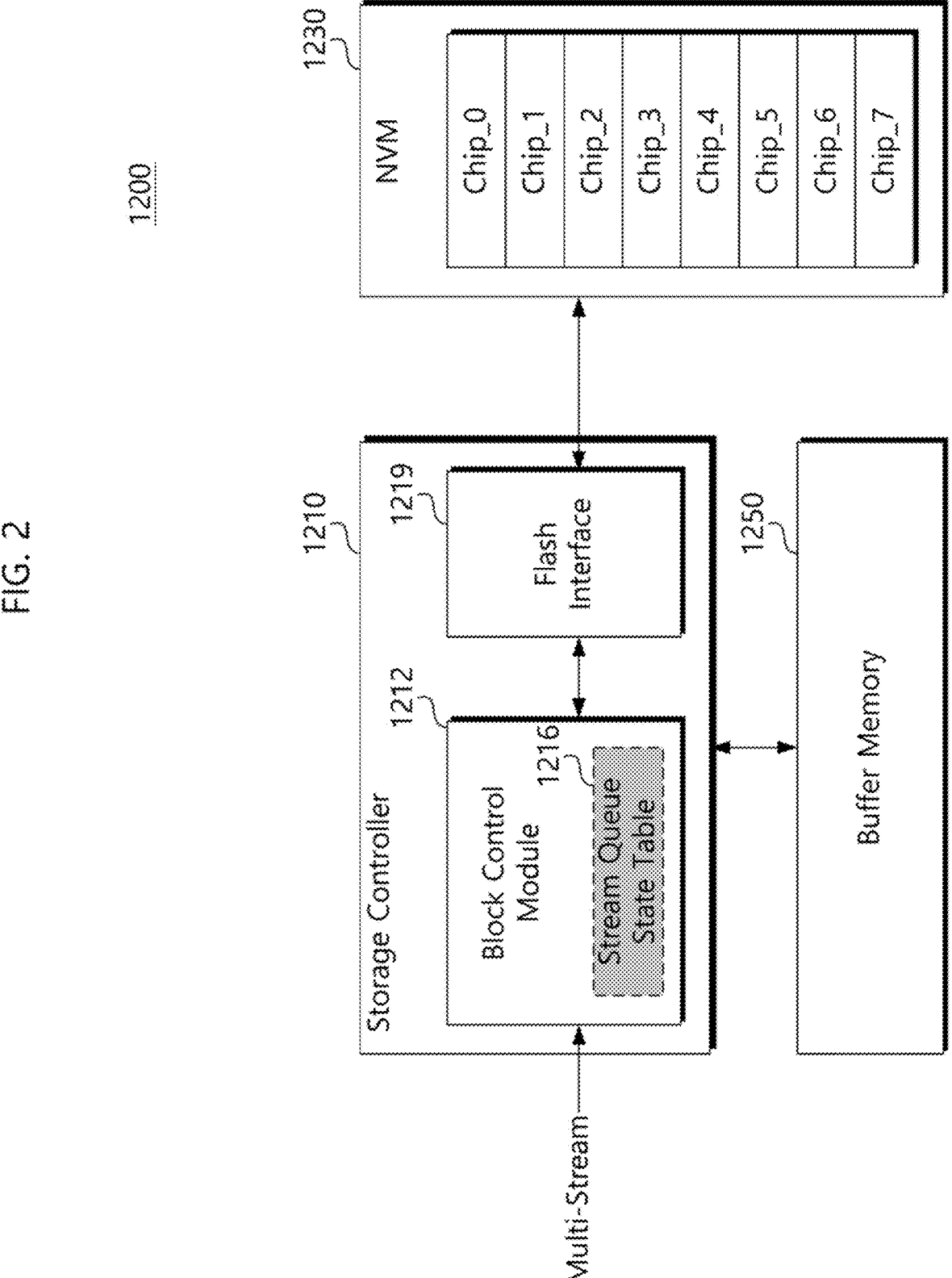
FIG. 2 is a block diagram showing the storage device of FIG. 1, according to one or more embodiments.

FIG. 2 is a block diagram showing the storage device of FIG. 1, according to one or more embodiments. Referring to FIG. 2, the storage device 1200 may include a storage controller 1210, a non-volatile memory device 1230, and a buffer memory 1250. For example, the storage controller 1210, the non-volatile memory device 1230, and the buffer memory 1250 may each be provided as one chip, one package, or one module. Alternatively, the storage controller 1210, the non-volatile memory device 1230, and the buffer memory 1250 may be included in one chip, one package, or one module. In other words, the storage controller 1210, the non-volatile memory device 1230, and the buffer memory 1250 may be implemented in a storage device such as an embedded memory, a memory card, a memory stick, and a solid state drive (SSD).

The storage controller 1210 may control the non-volatile memory device 1230 and the buffer memory 1250. For example, the storage controller 1210 may write data to the non-volatile memory device 1230 or read data stored in the non-volatile memory device 1230 at a request of the host 1100 (see FIG. 1). To access the non-volatile memory device 1230, the storage controller 1210 may receive an I/O request such as a read command or a write command. The I/O request from the host 1100 may include a logical address such as a logical block address (LBA) or a logical pate number (LPN).

The storage controller 1210 may evenly distribute multi-stream data requested to be written from the host 1100 to a plurality of chips Chip_0 to Chip_7 of the non-volatile memory device 1230. The storage controller 1210 may allocate one write stream evenly to the chips Chip_0 to Chip_7. In one or more other embodiment, the storage controller 1210 may distribute one write stream to one or some immediately writable chips among the chips Chip_0 to Chip_7. In still one or more other embodiments, the storage controller 1210 may evenly allocate a plurality of write streams to the chips Chip_0 to Chip_7. In yet one or more other embodiments, the storage controller 1210 may allocate one write stream to the chips Chip_0 to Chip_7 in random order. The operation of evenly allocating write streams to chips will hereinafter be referred to as chip balancing. For chip balancing for the above-described write stream, the storage controller 1210 may include a block control module 1212 and a flash interface 1219.

The block control module 1212 may allocate write data to the non-volatile memory device 1230 in response to a write request from the host 1100. In a case of the non-volatile memory device 1230 implemented by a NAND flash memory, memory areas are selected and managed in block units. Accordingly, when selecting a block of the non-volatile memory device 1230 for a write operation, one block must be selected from one chip.

The block control module 1212 may perform a chip balancing operation to evenly allocate write-requested multi-stream data to the chips Chip_0 to Chip_7. If a programmable-ready (or ready) chip exists among the chips Chip_0 to Chip_7, the block control module 1212 may allocate the write stream to the programmable-ready chip. On the other hand, there may be a case where the chips Chip_0 to Chip_7 are all in program operation (or busy). For example, if a programmable-ready chip does not exist, the block control module 1212 may allocate the write-requested stream to a chip with the smallest streams in a queue.

In one or more other embodiments, the block control module 1212 may randomly distribute write-requested multi-stream data to the chips Chip_0 to Chip_7. For example, the block control module 1212 may allocate multi-stream data requested to be written to the chips Chip_0 to Chip_7 according to a random sequence, regardless of the presence of a programmable-ready chip or the size of streams in a queue (or stream queue). In still one or more other embodiments, the block control module 1212 may allocate write-requested multi-stream data only to programmable-ready chips according to a random sequence.

For allocation of one or more write streams as described above, the block control module 1212 may create and manage a stream queue state table 1216. The stream queue status table 1216 may store and update the number of streams in a queue, a program status, a word line offset, and a ready or busy state of each of the chips Chip_0 to Chip_7. The block control module 1212 may evenly distribute write-requested multi-stream data to the chips Chip_0 to Chip_7 by referring to the stream queue status table 1216. Accordingly, stream imbalance, in which the queue of write streams is concentrated in one chip or some chips, can be prevented. The stream queue status table 1216 may further include information such as a workload of each of the chips Chip_0 to Chip_7 or the number of free blocks. Although the stream queue state table 1216 is depicted as being included in the block control module 1212, it will be understood that the stream queue state table 1216 may be stored and managed on the buffer memory 1250 instead.

The flash interface 1219 may provide an interface between the storage controller 1210 and the non-volatile memory device 1230. For example, multi-stream data allocated by the block control module 1212 may be transmitted to the non-volatile memory device 1230 through the flash interface 1219. As another example, data stored in the non-volatile memory device 1230 may be transmitted to the storage controller 1210 through the flash interface 1219.

The non-volatile memory device 1230 including the chips Chip_0 to Chip_7 may be implemented as a NAND flash memory, but the present invention is not limited thereto. The non-volatile memory device 1230 is shown as including eight chips Chip_0 to Chip_7, but the present invention is not limited thereto. Depending on the number of channels or banks, a varying number or arrangement of chips may be used as a storage medium of the non-volatile memory device 1230.

Multi-stream data requested to be written may be temporarily stored in the buffer memory 1250. Data to be read from the non-volatile memory device 1230 and transmitted to the host 1100 may also be temporarily stored in the buffer memory 1250. In addition, a mapping table for mapping logical addresses and physical addresses of multi-stream data requested to be written may be stored and managed in the buffer memory 1250. The buffer memory 1250 may include, for example, a synchronous DRAM. Accordingly, if a buffer memory 1250 of a sufficient capacity is used, write streams requested to be written can be accommodated, but a sharp increase in cost occurs. Stream imbalance between multi-stream chips can be resolved by the block control module 1212. Accordingly, writing performance for multi-stream data can be improved without increasing the capacity of the buffer memory 1250.

By using the storage device 1200 described above, stream imbalance in which multi-stream data requested to be written from the host 1100 are concentrated on one chip or area can be resolved. Accordingly, in the storage device 1200 that stores multi-stream data, performance degradation due to write load concentration on a specific chip or area, and reduction in a usage rate or a lifespan of chips, can be prevented.

Figure 3:
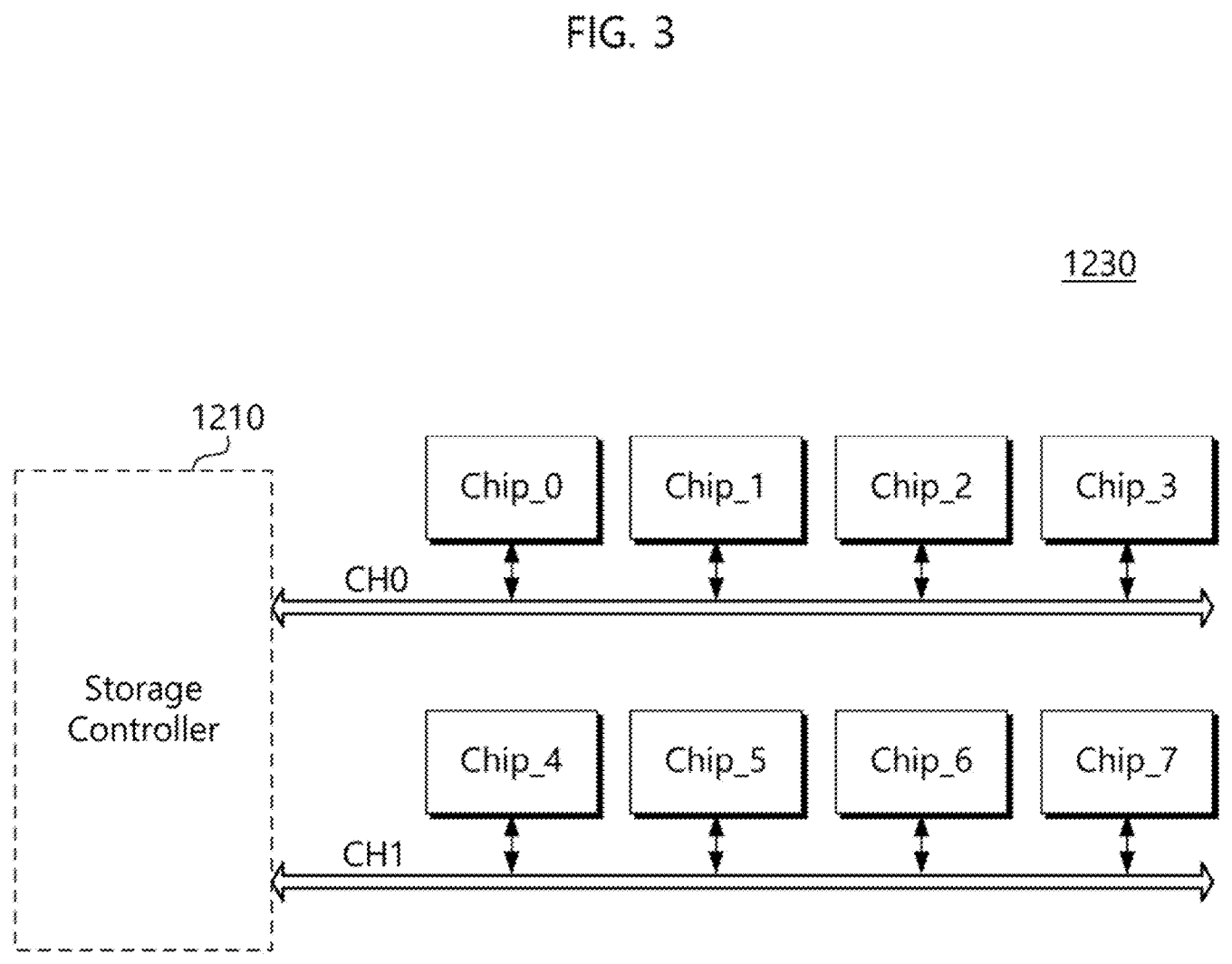

FIG. 3 is a block diagram illustrating a configuration of the non-volatile memory device shown in FIG. 2, according to one or more embodiments. Referring to FIG. 3, the non-volatile memory device 1230 may include a plurality of chips Chip_0 to Chip_7.

The plurality of chips Chip_0 to Chip_7 may be arranged in a multi-channel structure. For example, the chips Chip_0 to Chip_7 may be arranged in a 2-channel structure. For example, chips Chip_0 to Chip_3 are connected to the first channel CH0, and chips Chip_4 to Chip_7 are connected to the second channel CH1. The write speed of each of the chips Chip_0 to Chip_7 implemented as a flash memory device may be relatively slow. However, write performance can be improved by providing write commands and write data to chips connected to one channel in a pipeline. For example, when write commands and data are sequentially provided to each of the chips Chip_0 to Chip_3, the time required for a write operation for each chip is the same, but the write speed for all four chips can be increased.

Here, the non-volatile memory device 1230 including two channels has been described as an example, but the disclosure is not limited thereto. It will be appreciated that various numbers of chips may be connected to three or more channels in various embodiments.

Figure 4:
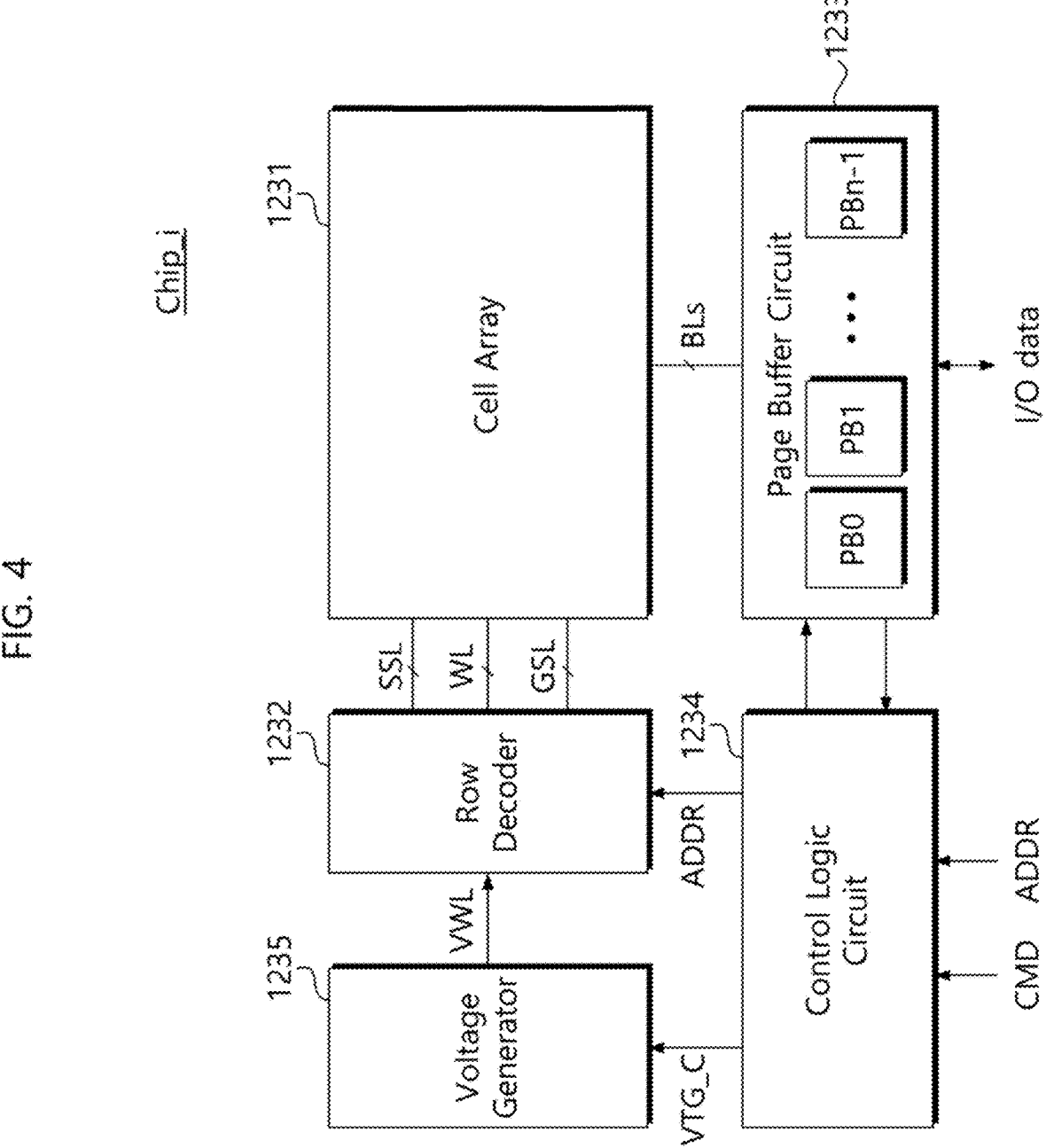
FIG. 4 is a block diagram showing the structure of a non-volatile memory device, according to one or more embodiments.

FIG. 4 is a block diagram briefly showing a structure of a non-volatile memory device, according to one or more embodiments. Referring to FIG. 4, the structure of one non-volatile memory chip Chip_i implemented as a flash memory device is shown. The non-volatile memory chip Chip_i may include a cell array 1231, a row decoder 1232, a page buffer circuit 1233, a control logic circuit 1234, and a voltage generator 1235. Although not shown in FIG. 4, the non-volatile memory chip Chip_i may further include a data input/output circuit or an input/output interface. Additionally, the non-volatile memory chip Chip_i may include components such as a column logic, a pre-decoder, a temperature sensor, a command decoder, and an address decoder.

The cell array 1231 may include a plurality of memory blocks. Each of the plurality of memory blocks may include a plurality of memory cells. A plurality of memory blocks may be included in one memory plane, but the disclosure is not limited thereto. The cell array 1231 may be connected to the page buffer circuit 1233 through bit lines BLs, and may be connected to the row decoder 1232 through word lines WLs, string select lines SSLs, and ground select lines GSLs. In an example embodiment, the cell array 1231 may include a three-dimensional memory cell array.

The row decoder 1232 may select one of the memory blocks of the cell array 1231 in response to an address ADDR. The row decoder 1232 may select one of the word lines of the selected memory block in response to the address ADDR. The row decoder 1232 delivers a word line voltage VWL corresponding to an operation mode to the word line of a memory block. During a program operation, the row decoder 1232 may transmits a program voltage and a verification voltage to the selected word line and a pass voltage to unselected word lines. During a read operation, the row decoder 1232 may deliver a read voltage to the selected word line and a read pass voltage to the unselected word lines.

The page buffer circuit 1233 may include a plurality of page buffers PB0 to PBn−1. A plurality of page buffers PB0 to PBn−1 may be respectively connected to memory cells through a plurality of bit lines BLs. The page buffer circuit 1233 may select at least one bit line among the bit lines BLs in response to a column address. The page buffer circuit 1233 may operate as a write driver or a sense amplifier depending on an operation mode. For example, during a program operation, the page buffer circuit 1233 may apply a bit line voltage corresponding to data to be programmed to one or more selected bit lines. During a read operation, the page buffer circuit 1233 may detect data stored in memory cells by detecting a current or voltage of the selected one or more bit lines.

The control logic circuit 1234 can generally control various operations within the non-volatile memory device 1230. The control logic circuit 1234 may programs data into the cell array 1231 or read data from the cell array 1231 in response to a control signal CTRL, a command CMD, and/or the address ADDR. Alternatively or additionally, the control logic circuit 1234 may output various control signals to erase data stored in the cell array 1231. For example, the control logic circuit 1234 may output a voltage control signal VTG_C, the address ADDR, etc. In an exemplary embodiment, the control logic circuit 1234 may output control signals for programming multi-bit data according to the received control signal CTRL, command CMD, and/or address ADDR.

The voltage generator 1235 may generate various types of voltage to perform program, read, and erase operations based on the voltage control signal VTG_C. For example, the voltage generator 1235 may generate a program voltage, a read voltage, and a program verification voltage as the word line voltage VWL. For example, the program voltage may be generated using an incremental step pulse program ISPP method.

FIG. 5 is a diagram showing an example of the stream queue state table shown in FIG. 2, according to one or more embodiments. Referring to FIG. 5, the stream queue status table 1216 may store and update a program status or stream queue information about chips to which multi-stream data will be allocated.

In the stream queue status table 1216, a ready state or a busy state (Ready/Busy), the number of streams in a queue (Number of S_Queue), and a word line offset (WL Offset) of each of the plurality of chips Chip_0 to Chip_7 are updated in real time. According to the illustrated stream queue status table 1216, streams Stream_0, Stream_1, and Stream_2 are currently being programmed in the chips Chip_0, Chip_1, and Chip_2. Accordingly, the ready state or the busy state of the chips Chip_0, Chip_1, and Chip_2 corresponds to the busy state in which immediate programming is not possible. On the other hand, there is no stream currently being programmed in the chips Chip_3, Chip_4, Chip_5, Chip_6, and Chip_7. Therefore, the ready state or the busy state of these chips Chip_3, Chip_4, Chip_5, Chip_6, and Chip_7 corresponds to the ready state that can be immediately programmed.

In addition, in these chips Chip_0, Chip_1, and Chip_2, streams Stream_0, Stream_1, and Stream_2 are each waiting for program execution. And the word line offset WL Offset of the chips Chip_0, Chip_1, and Chip_2 has been updated to the word lines WL10, WL30, WL20, and WL21. The word line offset WL Offset refers to a word line on which the program has currently been completed or is waiting for program execution in the corresponding chip. The word line offset WL Offset may be managed for each stream.

The block control module 1212 may allocate multi-stream data requested to be written to each of the chips Chip_0 to Chip_7 by referring to the stream queue state table 1216. For example, the block control module 1212 may allocate a newly opened stream Stream_4 to the chip Chip_3 among the chips Chip_3, Chip_4, Chip_5, Chip_6, and Chip_7 in a ready state for programming. Alternatively, the block control module 1212 may distribute and allocate the newly opened stream Stream_4 to at least two chips among the chips Chip_3, Chip_4, Chip_5, Chip_6, and Chip_7 in the ready state. Alternatively, the block control module 1212 may allocate the open stream Stream_4 to any one chip selected in a random order among the chips Chip_3, Chip_4, Chip_5, Chip_6, and Chip_7 in a ready state.

As described above, the block control module 1212 may allocate multi-stream data by referring to the queue status or program status of the chips stored in the stream queue status table 1216, thereby preventing stream imbalance in which program allocation is concentrated on one chip or some chips.

Figure 6:
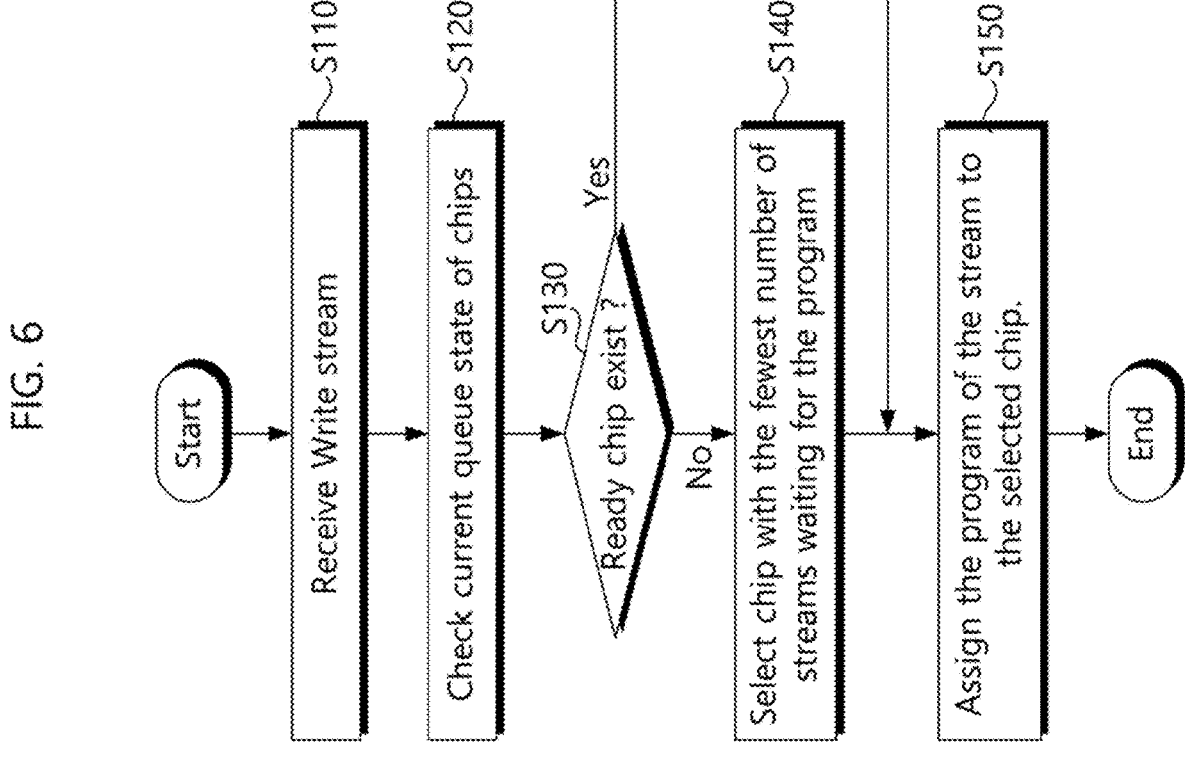
FIG. 6 is a flowchart showing a procedure for allocating multi-streams to a plurality of chips, according to one or more embodiments.

FIG. 6 is a flowchart showing a method for allocating multi-stream data to a plurality of chips according to one or more embodiments. Referring to FIG. 6, the storage device 1200 may evenly allocate multi-stream data requested to be written from the host 1100 according to the states of the chips. Using this multi-stream allocation method, stream imbalance, in which programmed streams are concentrated in one chip or area, can be resolved.

In step S110, the storage controller 1210 may receive a write stream from the host 1100. For example, the storage controller 1210 may receive a request to write multi-stream data transmitted along with a logical address from the host 1100. The host 1100 may provide write data in a multi-stream format by assigning different stream IDs depending on properties or attributes of the data. For example, the host 1100 may assign different stream IDs to different types of data, respectively. For example, the data type here may be one of text data, audio data, video data, etc., not being limited thereto. As another example, payload and meta data may be assigned different stream IDs, respectively.

In step S120, the block control module 1212 (see FIG. 2) of the storage controller 1210 may checks a queue status of each of the Chip_0 to Chip_7. The block control module 1212 may checks a ready state or a busy state, a stream ID currently being programmed, the number of streams in a queue, a stream ID listed in the queue, and a word line offset WL Offset of each of the plurality of chips Chip_0 to Chip_7 updated in real time in the stream queue status table 1216 (see FIG. 2).

In step S130, the block control module 1212 may determine whether a programmable-ready chip exists. If a programmable-ready chip exists ('Yes' direction), the procedure moves to step S150. On the other hand, if there is no programmable-ready chip among the plurality of chips Chip_0 to Chip_7 ('No' direction), the procedure moves to step S140.

In step S140, the block control module 1212 may refer to the stream queue status table 1216 and select a chip with the smallest number of streams in a queue. Alternatively, when two or more chips must be selected, the block control module 1212 may select chips in the order of decreasing the number of streams in a queue.

In step S150, the block control module 1212 may allocates write-requested multi-stream data to the selected chip or chips. A stream assigned to each chip may be immediately programmed to the chip if the chip is a programmable-ready chip. However, a stream allocated to a queue of a busy chip may be programmed after program of data currently being programmed is completed or after previously listed streams in the queues are exhausted.

In the above, according to the stream allocation method, stream imbalance in which multi-stream data requested to be written from the host 1100 are concentrated on one chip or some chips can be prevented. Accordingly, in the storage device 1200 managed in a multi-stream manner, performance degradation and a usage rate or a lifespan of chips due to concentration of a write load at specific chips can be prevented.

Figure 7:
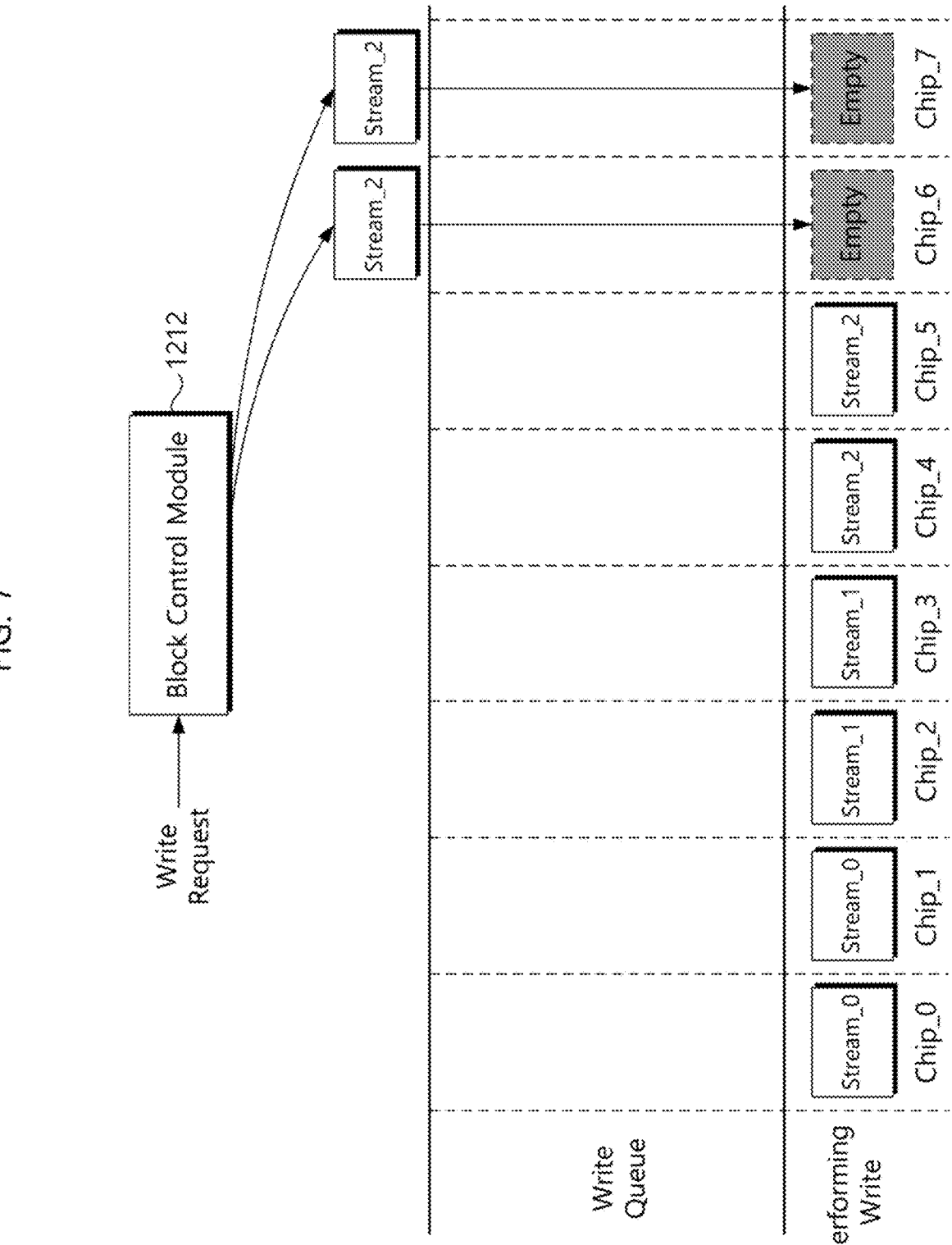
FIG. 7 is a diagram showing a stream allocation method of the block control module shown in FIG. 2, according to one or more embodiments.

FIG. 7 is a diagram showing a stream allocation method of the block control module shown in FIG. 2, according to one or more embodiments. Referring to FIG. 7, the block control module 1212 may evenly allocate streams to the plurality of chips Chip_0 to Chip_7 by referring to the stream queue state table 1216 (see FIG. 5).

It is assumed that the block control module 1212 has received a write request for a stream Stream_2. According to the stream queue state table 1216, six chips Chip_0 to Chip_5 are currently in a busy state, and only two chips Chip_6 and Chip_7 are in a ready state. For example, the chips Chip_0 to Chip_1 are programming the stream Stream_0, the chips Chip_2 and Chip_3 are programming the stream Stream_1, and the chips Chip_4 and Chip_5 are programming the stream Stream_2. On the other hand, two chips Chip_6, Chip_7 are in a ready state where no programming is currently being executed. And there is no waiting stream in a queue of each of the plurality of chips Chip_0 to Chip_7.

Accordingly, the block control module 1212 may select programmable-ready chips Chip_6 and Chip_7 as chips to which a write-requested stream Stream_2 may be allocated. Accordingly, when the write-requested stream Stream_2 may be divided and allocated to the chips Chip_6 and Chip_7, the storage controller 1210 may immediately transmit a program command to the chips Chip_6 and Chip_7. Then, write balance of all chips Chip_0 to Chip_7 may be achieved. In another embodiment, the stream Stream_2 requested to be written may be allocated to one of the chips Chip_6 and Chip_7 without being divided.

Figure 8:
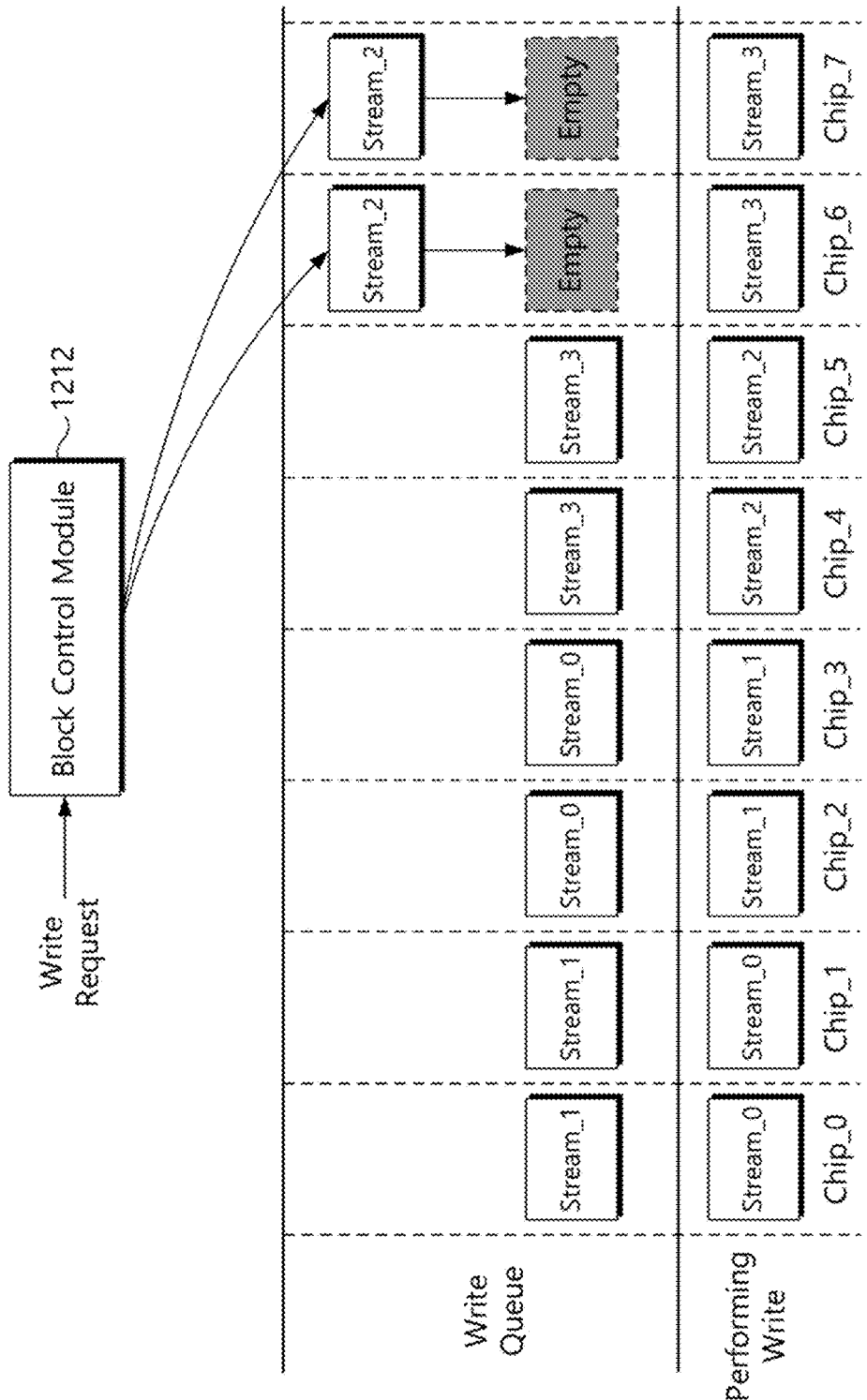
FIG. 8 is a diagram showing a stream allocation method of the block control module shown in FIG. 2, according to one or more other embodiments.

FIG. 8 is a diagram showing a stream allocation method of the block control module shown in FIG. 2, according to one or more other embodiments. Referring to FIG. 8, the block control module 1212 may evenly allocate streams to the plurality of chips Chip_0 to Chip_7 by referring to the stream queue status table 1216 (see FIG. 5).

It is assumed that the block control module 1212 has received a write request for a stream Stream_2. However, according to the stream queue state table 1216, it can be seen that all of the chips Chip_0 to Chip_7 are in a busy state. For example, the chips Chip_0 to Chip_1 are programming the stream Stream_0. And the chips Chip_2 and Chip_3 are each programming the stream Stream_1, the chips Chip_4 and Chip_5 are programming the stream Stream_2, and the chips Chip_6 and Chip_7 are programming the stream Stream_3. In addition, the chips Chip_0 to Chip_5 have already been assigned the streams Stream_0, Stream_1, and Stream_3 and registered in the queue.

The block control module 1212 may select the chips Chip_6 and Chip_7 with a small number of streams registered in the queue as chips to which to allocate the stream Stream_2 requested to be written. There are no allocated streams in the queue of chips Chip_6 and Chip_7. Accordingly, if the write-requested stream Stream_2 may be divided and allocated to the chips Chip_6 and Chip_7, write balance of the chips Chip_0 to Chip_7 may be achieved. In another embodiment, the stream Stream_2 requested to be written may be allocated to one of the chips Chip_6 and Chip_7 without being divided.

FIG. 9 is a diagram showing a stream allocation method of the block control module shown in FIG. 2, according to still one or more other embodiments. Referring to FIG. 9, the block control module 1212 may evenly allocate streams to the plurality of chips Chip_0 to Chip_7 by referring to the stream queue status table 1216 (see FIG. 5).

It is assumed that the block control module 1212 has received a write request for a stream. However, according to the stream queue state table 1216, it can be seen that all of the chips Chip_0 to Chip_7 are in a busy state. For example, the chips Chip_0 to Chip_1 are programming the stream Stream_0. And the chips Chip_2 and Chip_3 are programming the stream Stream_1, the chips Chip_4 and Chip_5 are programming the stream Stream_2, and the chips Chip_6 and Chip_7 are programming the stream Stream_3. In addition, the streams Stream_0, Stream_1, Stream_2, and Stream_3 are already allocated and registered in the queue of each of the chips Chip_0 to Chip_7.

The current stream queue state is achieving write equilibrium. Accordingly, streams requested to be subsequently written may be distributed sequentially or according to a random sequence to the empty queue.

Figure 10:
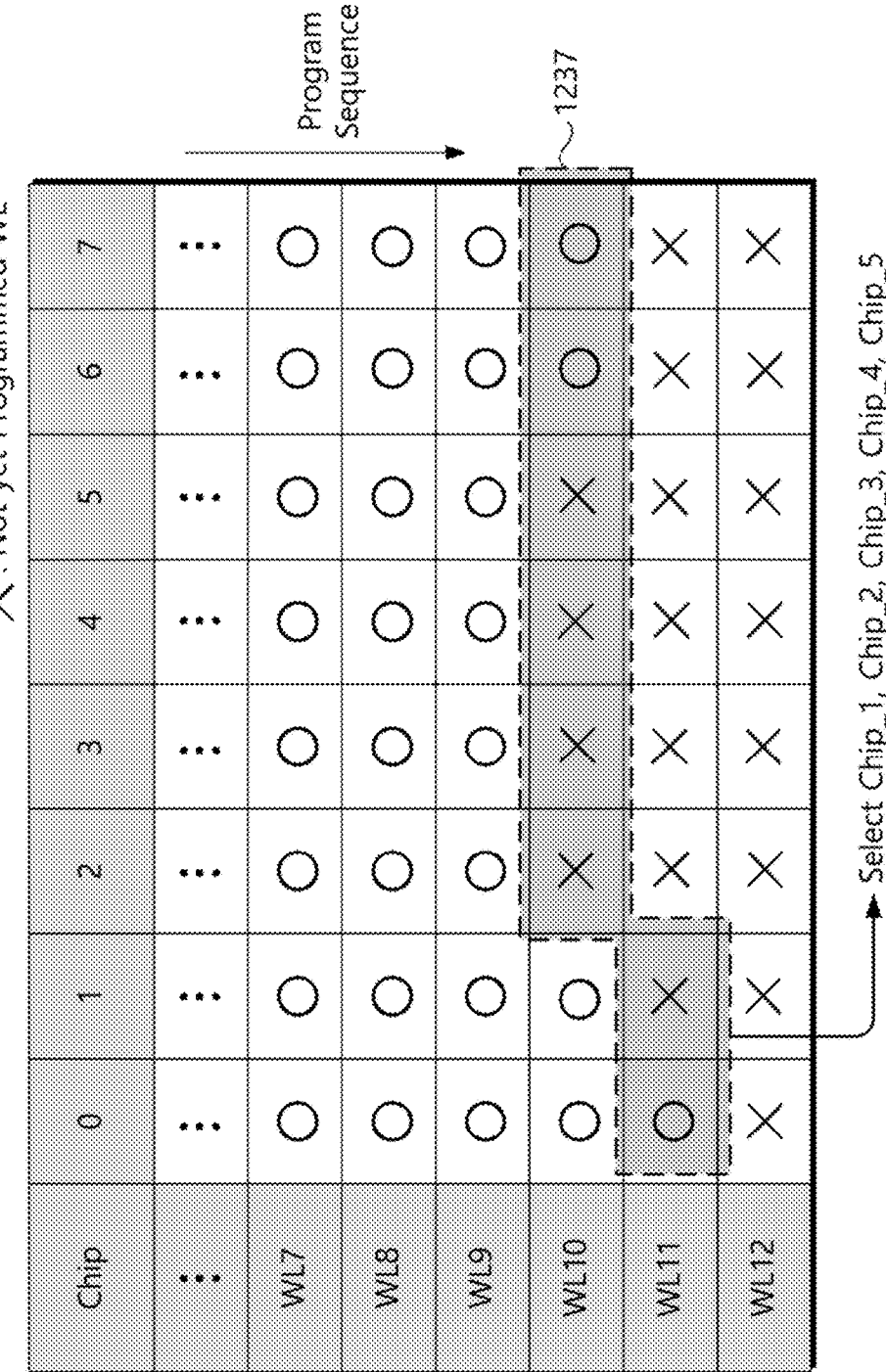
FIG. 10 is a table showing a chip allocation method for a write stream using word line offset, according to one or more embodiments.

FIG. 10 is a table showing a chip allocation method for a write stream using a word line offset, according to one or more embodiments. Referring to FIG. 10, programmable-ready chips may be selected according to a word line offset of each chip. In addition, streams requested to be written may be randomly assigned to selected programmable-ready chips.

Looking at the word line offsets of the chips Chip_0 to Chip_7, the chip Chip_0 has data programmed up to the word line WL11. The chips Chip_1, Chip_6, and Chip_7 have data programmed up to the word line WL10. And the chips Chip_2, Chip_3, Chip_4, and Chip_5 have been programmed up to the word line WL9. During program operation, the word line selection order proceeds sequentially from the word line WL0 to the final word line.

Among the word lines of the chips Chip_0 to Chip_7, the first unprogrammed word line corresponds to the word line WL10. And the first chip for which the word line WL10 is not programmed corresponds to the chip Chip_2. There are chips 1237 that can be selected simultaneously starting from the chip Chip_2. Among the eight chips 1237, the chips Chip_1, Chip_2, Chip_3, Chip_4, Chip_5 for which the word line WL10 or WL11 has not yet been programmed can be selected as candidate chips. The chips Chip_1, Chip_2, Chip_3, Chip_4, and Chip_5 that can be selected on a memory block basis may be selected as candidate chips for programming at least one stream requested to be written. A write-requested stream may be allocated to at least one of the selected candidate chips Chip_1, Chip_2, Chip_3, Chip_4, and Chip_5.

In another embodiment, the stream requested to be written may be randomly assigned to the selected candidate chips Chip_1, Chip_2, Chip_3, Chip_4, and Chip_5. For example, the stream requested to be written may not be written sequentially to the five candidate chips, but may be written randomly.

Figure 11:
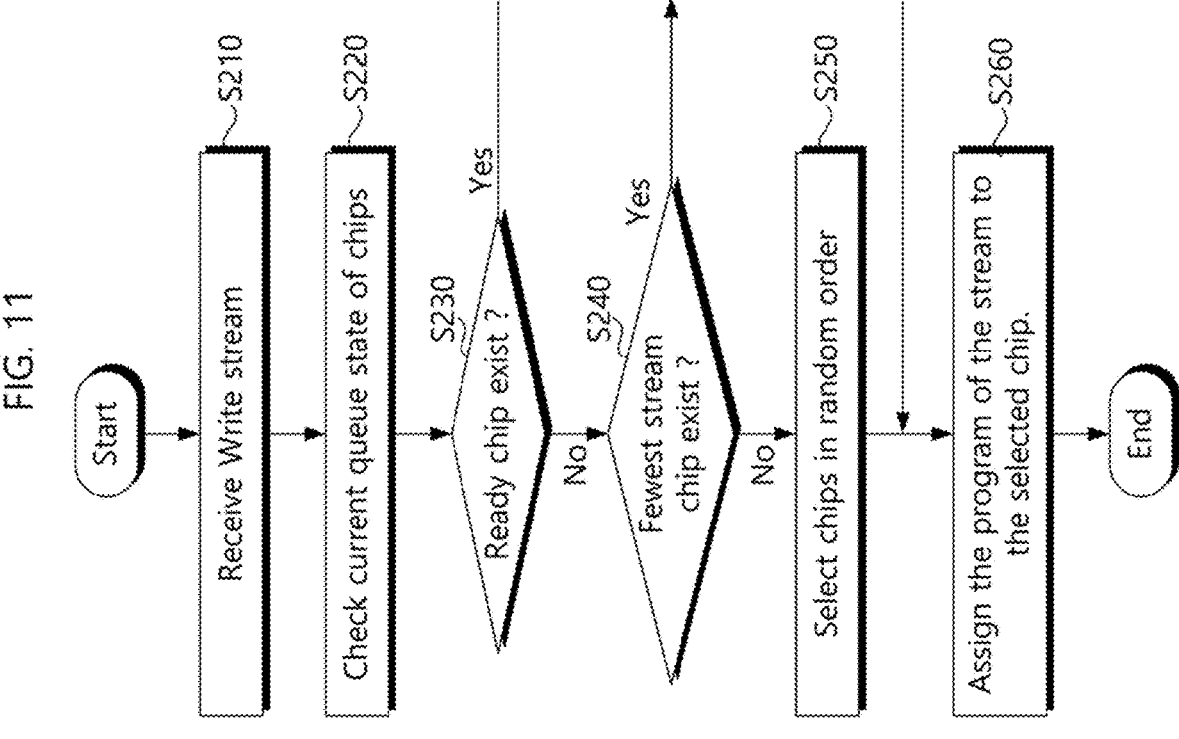
FIG. 11 is a flowchart showing a procedure for allocating multi-stream data to a plurality of chips, according to one or more embodiments.

FIG. 11 is a flowchart showing a procedure for allocating multi-stream data to a plurality of chips according to one or more embodiments. Referring to FIG. 11, the storage device 1200 may evenly allocate streams requested to be written from the host 1100 according to states of the chips.

In step S210, the storage controller 1210 may receive a write stream from the host 1100. For example, the storage controller 1210 may receive a stream write request sent along with a logical address from the host 1100. The host 1100 will provide write data in a multi-stream format by assigning different stream IDs depending on properties or attributes of the data.

In step S220, the block control module 1212 (see FIG. 2) of the storage controller 1210 may checks a stream queue status of each of the plurality of chips Chip_0 to Chip_7. The block control module 1212 may checks a ready state or a busy state, a stream ID currently being programmed, the number of streams in a queue, a stream ID listed in the queue, and a word line offset WL Offset of each of the plurality of chips Chip_0 to Chip_7 updated in real time in the stream queue status table 1216 (see FIG. 2).

In step S230, the block control module 1212 may determine whether a ready chip exists. If a ready chip exists ('Yes' direction), the procedure may move to step S260. On the other hand, if there is no ready chip among the plurality of chips Chip_0 to Chip_7 ('No' direction), the procedure may move to step S240.

In step S240, the block control module 1212 may refer to the stream queue status table 1216 to check whether a chip with the smallest number of streams in the queue exists. If there is a chip with the smallest number of streams in the queue ('Yes' direction), the procedure may move to step S260. On the other hand, if the chip with the smallest number of streams in the queue does not exist among the plurality of chips Chip_0 to Chip_7 ('No' direction), the procedure may move to step S250.

In step S250, the block control module 1212 may generate a random sequence to select a plurality of chips Chip_0 to Chip_7. For example, the block control module 1212 may generate a random sequence for each number (0, 1, 2, 3, 4, 5, 6, 7) for the plurality of chips Chip_0 to Chip_7. For example, the block control module 1212 generates a random sequence (0, 7, 4, 2, 1, 3, 5, 6) and selects the plurality of chips Chip_0 to Chip_7 according to the generated sequence to allocate the write stream.

In step S260, the block control module 1212 may allocates the write-requested stream to the selected chip or chips. The streams assigned to each chip may be immediately programmed to the selected chips if they are ready chips. However, streams assigned to queues on busy chips may be programmed into selected chips after programming of data currently being programmed is completed or after previously-listed streams in the queues are exhausted.

In the above, according to the stream allocation method, stream imbalance in which programmed streams are concentrated in one chip or area can be resolved. Accordingly, in the storage device 1200 managed in a multi-stream manner, performance degradation and a usage rate or a lifespan of chips due to concentration of a write load at specific chips can be prevented.

Figure 12:
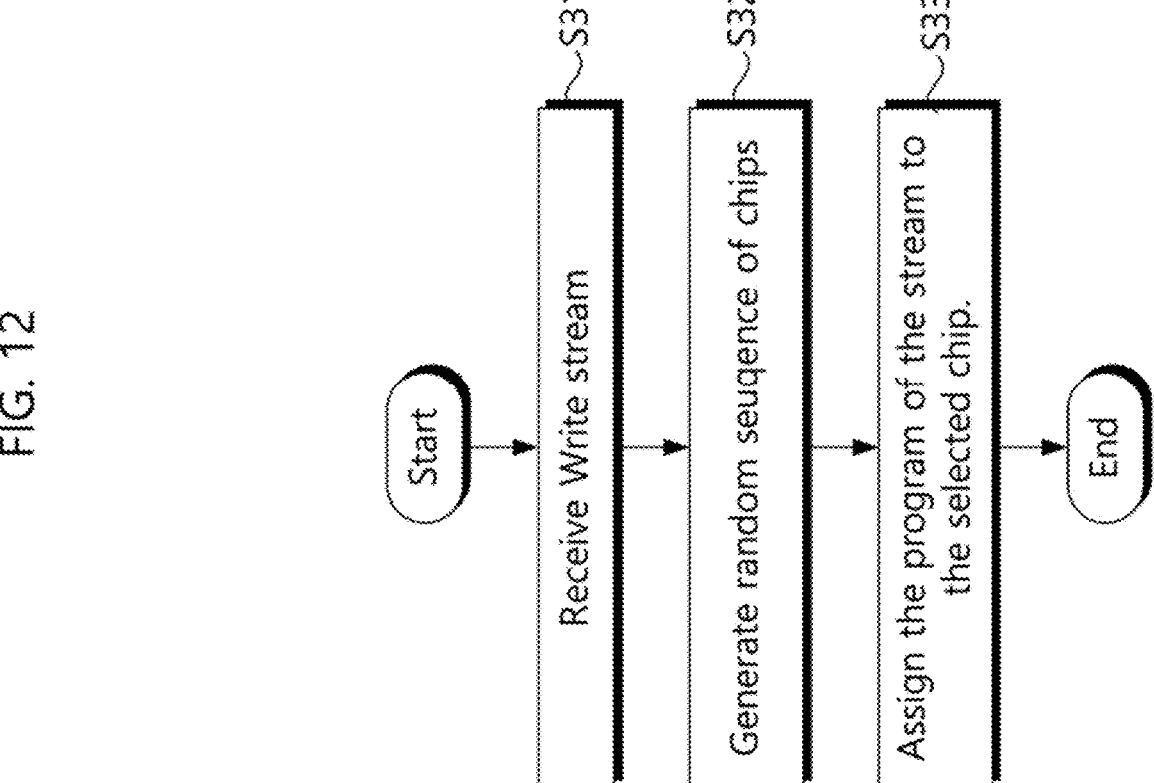
FIG. 12 is a flowchart showing a method for allocating multi-stream data to a plurality of chips, according to one or more embodiments.

FIG. 12 is a flowchart showing a method for allocating multi-stream data to a plurality of chips, according to one or more embodiments. Referring to FIG. 12, the storage device 1200 (see FIG. 2) may evenly allocate streams requested to be written from the host 1100 according to status of the chips.

In step S310, the storage controller 1210 (see FIG. 2) may receive a write stream from the host 1100. For example, the storage controller 1210 may receive a stream write request sent along with a logical address from the host 1100. The host 1100 may provide write data in a multi-stream format by assigning different stream IDs depending on properties or attributes of the data.

In step S320, the block control module 1212 may generate a random sequence to select the plurality of chips Chip_0 to Chip_7. For example, the block control module 1212 may generate a random sequence for each number (0, 1, 2, 3, 4, 5, 6, 7) for the plurality of chips Chip_0 to Chip_7. As another example, the block control module 1212 may generate a random sequence (3, 7, 5, 1, 0, 6, 4, 2). An algorithm or element for generating a random sequence may be selected arbitrarily. For example, a pseudo-random binary sequence (PRBS) or a linear feedback shift register (LFSR) may be used.

In step S330, the block control module 1212 may allocates one or more write-requested stream to the selected chip or chips. The streams assigned to each chip may be immediately programmed to the selected chips if they are ready chips. However, streams assigned to queues on busy chips may be programmed into selected chips after programming of data currently being programmed is completed or after previously-listed streams in the queues are exhausted.

In the above, according to the stream allocation method, stream imbalance in which programmed streams are concentrated in one chip or area can be resolved. Accordingly, in the storage device 1200 managed in a multi-stream manner, performance degradation and a usage rate or a lifespan of chips due to concentration of a write load at specific chips can be prevented.

Figure 13:
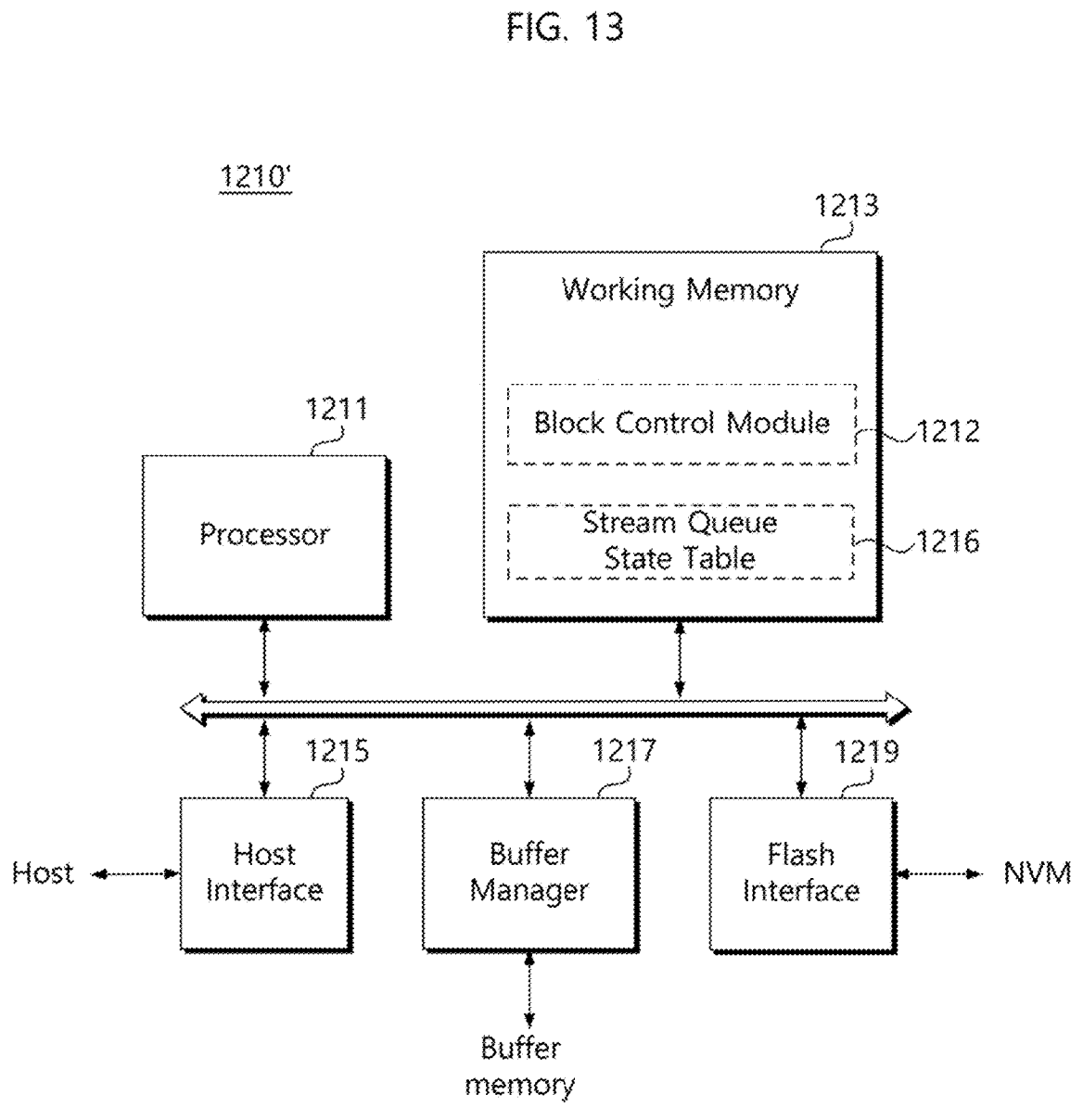

FIG. 13 is a block diagram showing a storage controller, according to one or more embodiments. Referring to FIG. 13, the storage controller 1210' may include a processor 1211, a working memory 1213, a host interface 1215, a buffer manager 1217, and a flash interface 1219. However, it will be well understood that the components of the storage controller 1210' are not limited to the components mentioned above. For example, the storage controller 1210 may further include a read-only memory (ROM) that stores code data required for a booting operation or an error correction code (ECC) block.

The processor 1211 may include a microprocessor such as a central processing unit, not being limited thereto. The processor 1211 may run software or firmware for driving the storage controller 1210'. For example, the processor 1211 may drive software modules loaded into the working memory 1213. For example, the processor 1211 may execute a software module such as the block control module 1212 loaded into the working memory 1213. Additionally, according to the execution of the block control module 1212, the processor 1211 may create and update the stream queue state table 1216. In addition, the processor 1211 may execute core functions of the storage device 1200, such as a flash translation layer (FTL). Additionally, the processor 1211 may be provided in a multi-core form including a plurality of CPUs.

Software (or firmware) or data for controlling the storage controller 1210 may be loaded into the working memory 1213. The software and data loaded into the working memory 1213 may be driven, executed, or processed by the processor 1211. For example, the block control module 1212 and the stream queue state table 1216 may be loaded into the working memory 1213. The working memory 1213 may be implemented with, for example, a static random-access memory (SRAM).

The block control module 1212 driven by the processor 1211 may respond to a write request from the host 1100 and allocate write data to the non-volatile memory device 1230. The block control module 1212 may distribute the write-requested multi-stream to a plurality of chips Chip_0 to Chip_7. If a ready chip exists among the plurality of chips Chip_0 to Chip_7, the block control module 1212 may allocate the write-requested stream to the ready chip. On the other hand, there may be a case where the plurality of chips Chip_0 to Chip_7 are all in program operation. In other words, if a ready chip does not exist, the block control module 1212 may allocate the write-requested stream to a chip with the smallest number of streams in a queue thereof.

The host interface 1215 may provide an interface between the host 1100 and the storage controller 1210'. The host 1100 and the storage controller 1210' may be connected through one of various standard interfaces. Here, the standard interfaces may include an advanced technology attachment (ATA), a serial ATA (SATA), an external SATA (e-SATA), a small computer small interface (SCSI), a serial attached SCSI (SAS), a peripheral component interconnection (PCI), and a PCI express (PCIe), a universal serial bus (USB), IEEE 1394, a universal flash storage (UFS), an embedded multi-media card (eMMC), an NVMe, an NVMe-of, NVMe-MI, etc.

The buffer manager 1217 may provide a buffer function for read or write data moving between the host interface 1215 and the flash interface 1219. The buffer manager 1217 may control the buffer memory 1250 implemented with a high-capacity dynamic random access memory (DRAM) and may provide a DMA function or a buffer function between the non-volatile memory device 1230 and the host 1100.

The flash interface 1219 may provide an interface between the storage controller 1210' and the non-volatile memory device 1230. For example, data processed by the processor 1211 may be stored in the non-volatile memory device 1230 through the flash interface 1219. As another example, data stored in the non-volatile memory device 1230 may be transmitted to the storage controller 1210' through the flash interface 1219.

Configurations of the storage controller 1210' described above by way of example have been described. According to the function of the storage controller 1210', the block control module 1212 provided as a software module may be driven. However, the block control module 1212 may be implemented with a combination of hardware or software.

FIG. 14 is a block diagram showing a storage system according to one or more embodiments. Referring to FIG. 14, the storage system 2000 may include a host 2100 and a storage device 2200 implemented as a solid state drive (SSD). The host 2100 and the storage device 2200 may be or correspond to the host 1100 and the storage device 1200 described with reference to FIGS. 1 to 13, respectively. Alternatively, the host 2100 and the storage device 2200 may operate based on the operation method described with reference to FIGS. 1 to 13.

The storage device 2200 may exchange a signal SIG including data with the host 2100 through the signal connector 2201 and receive power PWR through the power connector 2202. The storage device 2200 may include an SSD controller 2210, a plurality of non-volatile memories 2230, a buffer memory 2250, and an auxiliary power supply 2270.

The SSD controller 2210 may control the non-volatile memories 2230 in response to a signal SIG received from the host 2100. The non-volatile memories 2230 may operate under the control of the SSD controller 2210. The auxiliary power device 2270 may be connected to the host 2100 through the power connector 2202. The auxiliary power supply device 2270 may receive power PWR from the host 2100 and charge it. The auxiliary power device 2270 may provide power to the storage device 2200 when power supply from the host 2100 is not smooth. The buffer memory 2250 may be used as a buffer memory of the storage device 2200.

The storage device 2200 may evenly distribute multi-stream data requested for writing from the host 2100 through the block control module 2220 to a plurality of chips of the non-volatile memory device 2230. In some embodiments, the storage controller 2210 may allocate one write stream evenly to the chips such that each of the chips is programmed the same amount of data of the one write stream. In another embodiment, the storage controller 2210 may evenly distribute one write stream to some immediately writable chips among the chips. In still another embodiment, the storage controller 2210 may evenly allocate a plurality of write streams to the chips such that each of the chips is programmed the same amount of data of the plurality of write streams. Alternatively, the storage controller 2210 may allocate one write stream to the chips in a random order.

The storage system 2000 described above can solve the problem that streams requested to write from the host 2100 are concentrated on some chips. Accordingly, performance degradation due to concentration of a write load at a specific chip in the multi-stream storage device 2200, reduction in utilization of chips, and reduction in a lifespan can be prevented.

The above-described embodiments are example embodiments for carrying out the disclosure. In addition to the above-described embodiments, the disclosure may include simple design changes or easily changeable embodiments. In addition, the disclosure may cover techniques that can be easily modified and implemented using the embodiments. Therefore, the scope of the disclosure should not be limited to the above-described embodiments, and should be defined by the claims and equivalents of the claims as well as the claims to be described later.

16

What is claimed is:

1. A method of operating a storage device comprising a plurality of chips, the method comprising:
   receiving a write request of stream data;
   checking a program status or a stream queue of each of the plurality of chips;
   based on a determination that there is at least one chip in a ready state with an empty stream queue among the plurality of chips, allocating the stream data to the at least one chip in the ready state; and
   based on a determination that there is no chip in the ready state among the plurality of chips, allocating the stream data to at least one chip based on a number of streams in a stream queue among the plurality of chips.

2. The method of claim 1, further comprising:
   generating a random sequence of the plurality of chips based on a determination that there is no chip in the ready state and there is no chip with the smallest number of streams in the stream queue among the plurality of chips; and
   allocating the stream data to the plurality of chips according to the random sequence.

3. The method of claim 1, wherein the at least one chip comprises two or more chips, and
   wherein the stream data has a same data property or a same data attribute.

4. The method of claim 1, wherein the program status of each of the plurality of chips comprises a word line offset corresponding to a programmed word line number of each of the plurality of chips.

5. The method of claim 4, further comprising:
   selecting candidate chips for allocating the stream data among the plurality of chips according to the word line offset.

6. The method of claim 5, wherein the candidate chips have a less number of programmed word lines among the plurality of chips.

7. The method of claim 6, further comprising:
   programming the stream data by randomly selecting at least one of the candidate chips that are selected for the allocating the stream data.

8. The method of claim 1, wherein the program status comprises a workload or a number of free blocks of each of the plurality of chips.

9. A storage device comprising:
   a non-volatile memory device comprising a plurality of chips; and
   a storage controller configured to allocate a write-requested stream to at least one of the plurality of chips by referring to a program status and a stream queue state of each of the plurality of chips,
   wherein, based on a determination that at least one chip in a ready state with an empty stream queue exists among the plurality of chips, the storage controller is configured to allocate the write-requested stream to the at least one chip in the ready state, and
   wherein, based on a determination that there is no chip in the ready state with the empty stream queue among the plurality of chips, the storage controller is configured to allocate the write-requested stream to at least one chip based on a number of streams in a stream queue among the plurality of chips.

10. The storage device of claim 9, wherein the storage controller is configured to randomly select at least one of the plurality of chips and allocate the write-requested stream based on a determination that there is no chip in the ready state and there is no chip with the smallest number of streams in the stream queue.

11. The storage device of claim 9, wherein the at least one chip comprises two or more chips, and wherein the write-requested stream has a same data property or a same data attribute.

12. The storage device of claim 9, wherein the storage controller is configured to select at least one chip for allocating the write-requested stream from among the plurality of chips by referring to a word line offset corresponding to a word line number in which programming has been completed for each of the plurality of chips.

13. The storage device of claim 12, wherein the storage controller is configured to randomly select and allocate the write-requested stream to at least one of candidate chips having a less number of programmed word lines among the plurality of chips.

14. The storage device of claim 9, wherein the at least one chip comprises two or more chips, and wherein the write-requested stream has a same stream identifier allocated by a host device which transmits the write-requested stream to the storage controller.

15. The storage device of claim 14, wherein the program status comprises a workload or a number of free blocks of each of the plurality of chips.

16. A method of operating a storage device comprising a plurality of NAND chips:

receiving a write request for stream data;

checking a word line offset indicating a programmed word line of each of the plurality of NAND chips;

selecting candidate chips to write the stream data according to the word line offset; and programming the stream data into the candidate chips, wherein in the selecting the candidate chips, at least one chip having an unprogrammed first word line and at least one chip having an unprogrammed second word line to be programmed after the first word line are selected as the candidate chips among the plurality of NAND chips.

17. The method of claim 16, wherein the stream data is divided into the candidate chips and programmed.

18. The method of claim 16, wherein the stream data is programmed into any one of the candidate chips.

19. The method of claim 18, wherein the any one of the candidate chips is selected according to a random sequence.

20. The method of claim 19, wherein the random sequence is generated from a pseudo-random binary sequence (PRBS) algorithm or a linear feedback shift register (LFSR).

* * * * *